United States Patent
Harville et al.

(10) Patent No.: US 7,522,769 B2
(45) Date of Patent: Apr. 21, 2009

(54) METHOD AND SYSTEM FOR SKIN COLOR ESTIMATION FROM AN IMAGE

(75) Inventors: Michael Harville, Palo Alto, CA (US);
Harlyn Baker, Los Altos, CA (US);
Nina Bhatti, Mountain View, CA (US);
Sabine Susstrunk, Lausanne (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 701 days.

(21) Appl. No.: 11/233,602

(22) Filed: Sep. 9, 2005

(65) Prior Publication Data
US 2007/0058860 A1    Mar. 15, 2007

(51) Int. Cl.
*G06K 9/00* (2006.01)
(52) U.S. Cl. ...................... 382/167; 382/162
(58) Field of Classification Search ................ 382/103, 382/118, 170, 190, 171, 162, 167, 165, 231.4, 382/222.1; 348/169, 129, 231.4, 222.1; 705/26; 358/501, 518, 523; 345/207; 340/469, 425.5
See application file for complete search history.

(56) References Cited

U.S. PATENT DOCUMENTS

| | | | |
|---|---|---|---|
| 6,188,777 B1* | 2/2001 | Darrell et al. | 382/103 |
| 7,092,569 B1* | 8/2006 | Kinjo | 382/190 |
| 7,379,591 B2* | 5/2008 | Kinjo | 382/170 |
| 2002/0141639 A1 | 10/2002 | Steinberg | |

FOREIGN PATENT DOCUMENTS

| | | |
|---|---|---|
| EP | 1267217 | 12/2002 |
| JP | 05059312 | 3/1993 |
| WO | WO 0213136 | 2/2002 |

OTHER PUBLICATIONS

Kocheisen et al., "A Neural Network for Grey Level and Color Correction Used in Photofinishing", IEEE, vol. 4, Jun. 1996, pp. 2166-2171.*
Harville, Michael et al: "Consistent image-based measurement and Classification of Skin Color" IEEE International Conf. on Inage Proc. vol. 2, Sep. 11, 2005 to Sep. 14, 2005 pp. 374-377.

* cited by examiner

*Primary Examiner*—Anh Hong Do

(57) ABSTRACT

Embodiments of the present invention recite a computer implemented method and system for estimating skin color from an image. In embodiments of the present invention, an image of a subject and of an imaged reference color set is accessed. In embodiments of the present invention, a controlled infrastructure is not required when capturing the image. At least one skin pixel of the subject is located in the image and a color description of the at least one skin pixel is determined. Then, a color correction function to be applied to the color description of the at least one skin pixel is determined. The color correction function is applied to the color description of the at least one skin pixel to create a modified color description. Finally, the skin color of the subject is estimated based upon an analysis of the modified color description.

30 Claims, 6 Drawing Sheets

METHOD AND SYSTEM FOR SKIN COLOR ESTIMATION FROM AN IMAGE

TECHNICAL FIELD

Embodiments of the present invention are related to computer implemented method for estimating and classifying skin color.

BACKGROUND

Much image processing work has been applied to detecting skin pixels in a digital image. Most of this work does not attempt to produce a single estimate of the skin color a person in the image, but instead simply classifies pixels into skin and non-skin categories, using broad models of skin color that apply across many types of imaging conditions. In many cases, non-skin objects with skin-like color, such as cardboard boxes and wooden tables, are classified as skin pixels by such algorithms. Some prior methods attempt to produce a skin color estimate of a person in an image, but these typically do not account for the effects of the lighting and imaging device at the time of the image capture. Thus, the resulting skin color estimates of the same person in different images may be very different if the lighting or imaging device has been changed.

Much less work has investigated objective measurement of human skin coloration to enable its color classification. Classification of a person's skin coloration would be useful, for example, in the medical field for quantification of skin erythema, lesions, ultra-violet radiation effects, and other phenomena. In the field of computer graphics people could be rendered more accurately in video-conferencing, or their appearance could be improved or altered. In the fashion industry, automated suggestion of personal appearance products, such as clothing, makeup, and eyeglasses, that complement skin tone could be facilitated. In the field of biometrics, automatic classification of skin color could be used as an aid in recognizing a person, or used in systems in which determination of skin coloring is useful.

Prior work in the medical domain currently requires sophisticated, calibrated instrumentation and controlled lighting and is not designed to discriminate skin colors across people. In the field of computer graphics and interfaces, emphasis has been directed to representation and synthesis rather than classification of skin color, and multi-spectral data beyond what a camera normally provides is sometimes required. Other methods use a camera, colorimeter, spectrophotometer, or confocal imaging under controlled illumination to estimate skin color at a specific skin location manually selected by a human operator. Some of these methods obtain spectral reflectance values for the skin with controlled illumination provided by the device itself, thus producing a skin color representation that is independent of the ambient illumination. The disadvantage of such methods is that the capture devices used are much more expensive than a typical camera and require a trained operator.

Other prior work extracts skin color characteristics, such as bi-directional reflectance distribution functions (BRDFs), or melanin and hemoglobin content that are independent of the illuminant and the imaging device. However, that work focused on synthesis of new images of a person under different conditions, such as changed lighting, and did not attempt to extract, from their extensive measured data, a single estimate representing the skin color of the person. Instead, they obtained, in effect, a set of skin color estimates from different locations on the subject's face. The selection, combination, and reduction of these spatially-varying skin color estimates to a single estimate representing the overall skin color requires analysis of facial features and measured color statistics, and is thus non-trivial. Also, some of these methods use multiple images to measure the skin color characteristics.

Some current methods rely upon a controlled infrastructure in which the ambient lighting conditions and the camera processing parameters are carefully calibrated and controlled. Prior knowledge of the camera processing parameters and lighting conditions are necessary in these methods in order to accurately classify the skin color of a person by compensating for these effects in the picture being analyzed. One or more pictures of the subject are taken and analyzed by a human consultant who then generates, for example, a cosmetics consultation to the subject. However, due to the expense and amount of space these facilities require, they are not generally made available to most subjects. Other systems rely upon a plurality of pictures which record different locations of the subject's skin or under different lighting conditions.

DISCLOSURE OF THE INVENTION

Embodiments of the present invention recite a computer implemented method and system for estimating skin color from an image. In embodiments of the present invention, an image of a subject and of an imaged reference color set is accessed. In embodiments of the present invention, a controlled infrastructure is not required when capturing the image. At least one skin pixel of the subject is located in the image and a color description of the at least one skin pixel is determined. Then, a color correction function to be applied to the color description of the at least one skin pixel is determined. The color correction function is applied to the color description of the at least one skin pixel to create a modified color description. Finally, the skin color of the subject is estimated based upon an analysis of the modified color description.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "determining," "locating," "applying," "estimating," "using," "detecting," "identifying," "sampling," "validating," "printing," "calculating," "comparing," "discovering," "deriving," "implementing," "analyzing," "processing," "rejecting," "applying," "outputting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
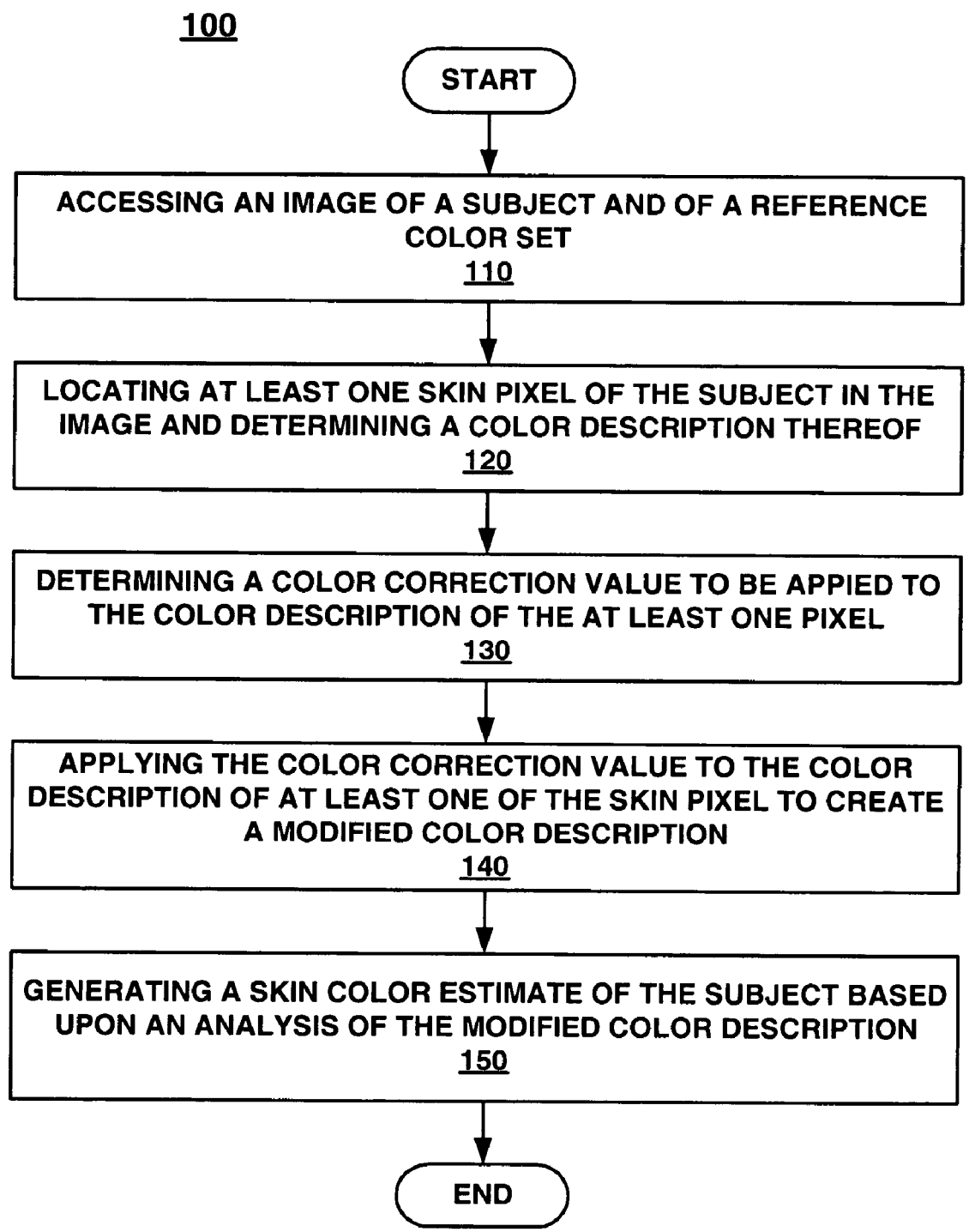
FIG. 1 is a flowchart of a method for estimating skin color from an image in accordance with embodiments of the present invention.

FIG. 1 is a flowchart of a method 100 for estimating skin color from an image in accordance with embodiments of the present invention. In step 110 of FIG. 1, an image of a subject and of a reference color set is accessed. Typically, the quality and spectral characteristics of light falling on a given subject affect the subject's appearance to a camera and thus in the image generated by the camera. The camera itself, through physical characteristics of the design and fabrication of its sensor, and also through internal processing characteristics of the camera, introduces further alteration in the perceived skin coloration of the subject. These effects combine to make skin coloration metrics of the image highly dubious. By viewing a set of reference colors captured along with the image of the subject, embodiments of the present invention may facilitate determining a transformation from the observed color space of a captured image to a reference or "true" color space that is independent of the ambient lighting conditions and imaging characteristics of the camera which captures the image.

In step 120 of FIG. 1, at least one skin pixel of the subject in the image is located and a color description of the at least one skin pixel is determined. In order to analyze the image of a user to identify the user's skin coloration, a selection of image skin color regions representative of the user's true skin color is made. Some embodiments of the invention attempt to find these skin color regions on the face of the imaged subject. Selecting these elements of the user's face and head to sample for color values involves identifying the location and orientation of the user's face within the image. Furthermore, a determination of where within the face to collect appropriate skin coloration measurements is made.

Embodiments of the present invention may be configured to determine which regions of a user's face (e.g., the forehead, cheeks, chin, etc.) are highly predictive of the subject's overall face coloration. This ensures that coloration of the skin itself, and not freckles, blemishes, hair color, eye color, or other incorrect values, is measured. In embodiments of the present invention, techniques known to practitioners of computer vision facilitate making these determinations. For example, heads can be detected through various computer implemented "face-detection" methods and the orientation of the head can be determined through techniques such as mesh-fitting to derived control points. Samples of skin coloration can then be selected from known locations on these meshes. Alternatively, statistical analysis of skin color without mesh fitting can also be used to estimate skin coloration. Embodiments of the present invention may utilize computer implemented skin color detection methods in conjunction with the face-detection methods to further refine detecting the subject's face. These skin color detection methods identify probable skin areas based upon the colors displayed in a picture.

In embodiments of the present invention, validation of the samples as being representative of the appropriate skin coloration can be performed using standard outlier rejection principles. The result is a set of skin measurements that is substantially free of defect or extraneous material and which provides a usable sampling of the subject's skin coloration. Furthermore, while the present embodiment teaches determining which regions of a user's face are representative of the subject's natural skin color, other embodiments of the present invention are well suited to analyzing the skin coloration of the subject's entire face, or other skin regions of the subject such the neck, arms, etc. This may also comprise excluding some areas such as the eyes, hair, facial hair, etc. which are not representative of the subject's skin coloration.

Upon locating pixels that are likely to be representative of the subject's skin color, a color description of those pixels is determined. As will be discussed in greater detail below, there are a variety of color description methods that may be used. For example, a color description may comprise, but is not limited to, any of the following: a three-component vector in some color space (for example, the sRGB standard space), a probability density function over a color space, or a histogram of color values.

In step 130 of FIG. 1, a color correction function is determined, based at least in part on the imaged reference color set in the accessed image. In embodiments of the present invention, the true color space is represented by a control reference color set (e.g., 208 of FIG. 2). It is appreciated that the control reference color set 208 may comprise a logical reference color set from which the spectral reflectance and color signal values are accessed, rather than an actual physical entity. By comparing the characteristics of control reference color set with the characteristics of the reference color set captured in the image, embodiments of the present invention can determine a transformation, or "color correction function," which accounts for the discrepancy between the first, imaged reference color set and the control reference color set characteristics. This color correction function directly compensates for the combined effect of the ambient lighting in the room and the color transformation of the acquiring camera.

To facilitate determining this color correction function, embodiments of the present invention detect the imaged reference color set within the image and measure the observed characteristics of the imaged reference color set. Embodiments of the present invention then determine a color correction function that brings color descriptions of the imaged reference color set optimally close to the color values of control reference color set.

In step 140 of FIG. 1, the color correction function is applied to the color description of at least one of the plurality of skin pixels to create a modified color description. In embodiments of the present invention, the color correction function determined in step 130 may be applied to all image pixels prior to further processing and analysis steps. In so doing, a modified color description of the identified skin pixels is created in which the skin pixel(s) of the subject have been corrected to remove the effects of ambient lighting and image processing capabilities of the image capture device at the time the image was captured. In some embodiments, the color transformation is only applied to a selected subset of the pixels determined to be representative of the overall skin coloration of the user. This likelihood may be determined as described above, or utilize other image analysis techniques. In some embodiments of the present invention, the color transformation is applied to aggregate skin coloration statistics, such as the mean or median, obtained from pixels determined as likely to pertain to the user. By applying the color correction function to the subject within the image, the "natural" skin coloration of the subject is determined in the color space in which the control reference color set is specified. This facilitates accurately estimating the skin color of the subject in the image.

In step 150 of FIG. 1, a skin color estimate of the subject is generated based upon an analysis of the modified color description of the subject's skin pixels. In embodiments of the present invention, the skin color estimate (e.g., 413 of FIG. 4) may comprise a single vector having the same dimension as reference colors in the control reference color set 208. In another embodiment, skin color estimate 413 may comprise a probability density function over the color space represented by control reference color set 208. In another embodiment, a variance or a probability of error is computed for each skin color estimate 413 generated by image analysis system. In another embodiment, an averaging of the skin pixel values, with optional weights, may result in a single skin color estimate 413. The optional weights may be determined in part by the likelihoods of individual skin pixels being located at good image sampling locations for skin, where these likelihoods are determined by skin pixel selection component 402. It is noted that skin color estimate 413 may not comprise a single skin color, but may refer to a class or range of skin colors.

Thus, embodiments of the present invention can infer the combined effects of the ambient lighting conditions at the location at which the image is captured as well as device characteristics and the image processing capabilities of the image capture system. These combined effects are then substantially eliminated from the image such that an accurate estimation of the skin color of the subject can be made based upon an analysis of the image. Again, it is noted that the sequence of method 100 may be changed in embodiments of the present invention. For example, locating the plurality of skin pixels of the subject may precede determining the color correction function to be applied to the image.

Figure 2:
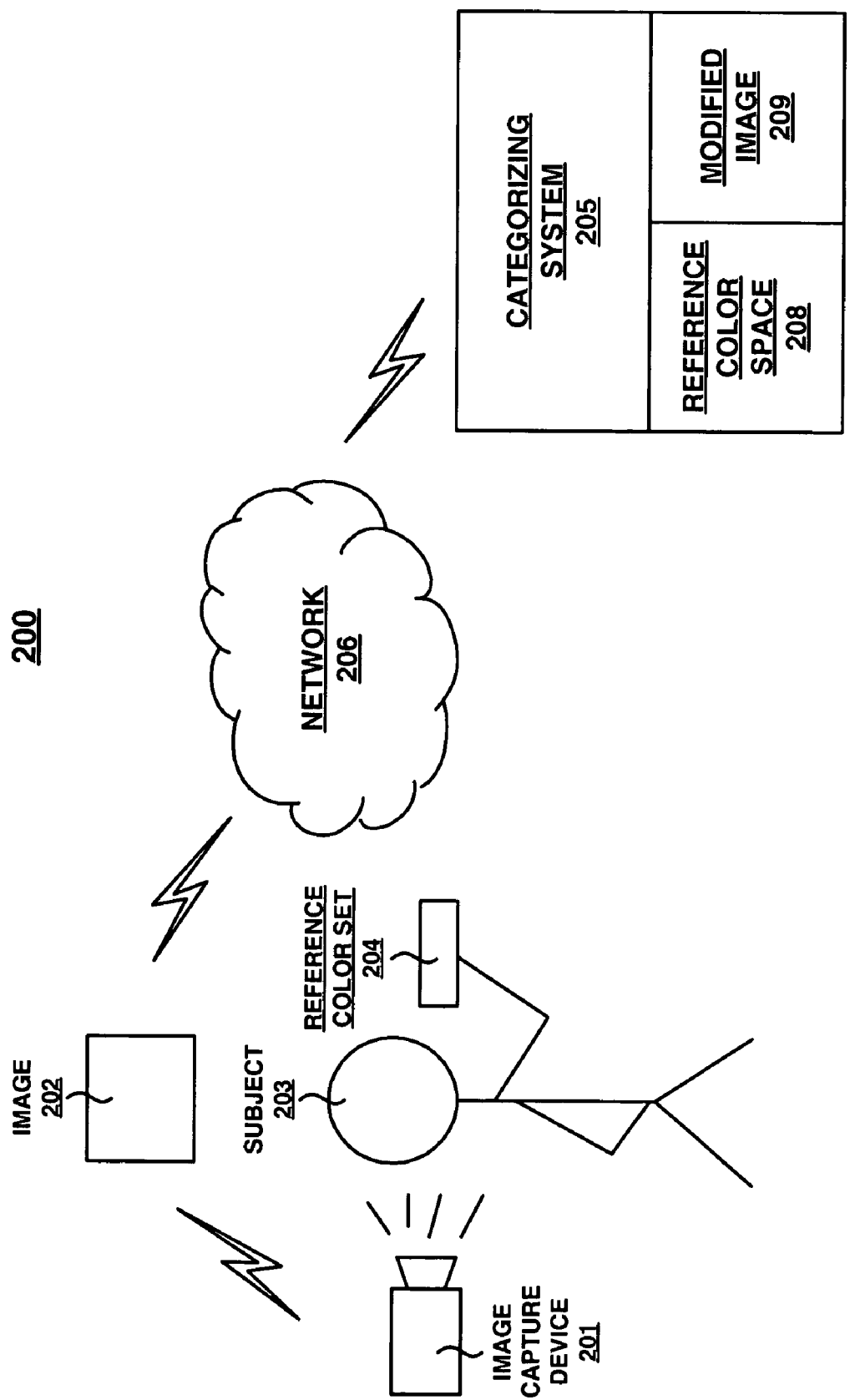
FIG. 2 shows an exemplary image capture system used in conjunction with embodiments of the present invention.

FIG. 2 shows an exemplary image capture system used in conjunction with embodiments of the present invention. In embodiments of the present invention, system 200 comprises an image capture device 201 for capturing an image 202 comprising a subject (e.g., 203) and imaged reference color set 204. In embodiments of the present invention, image capture device 201 does not require a controlled infrastructure when capturing image 202. For example, image capture device 201 may be a subject's personal computer system, digital camera, or a cellular telephone capable of generating photographs (e.g., referred to herein as a "picture phone"). Thus, rather than relying upon calibrated equipment (e.g., calibrated cameras and calibrated lighting), embodiments of the present invention may utilize the subject's personal equipment during the product consultation process. Furthermore, there is no requirement for the image to be captured in an environment in which the ambient lighting conditions are known and controlled as long as the lighting conditions are sufficient for system 200 to process the image. As a result, image 202 may even be captured in a variety of environments including, for example, outdoors, or in the home of subject 203.

Returning to FIG. 2, image 202 is then conveyed to an image analysis system 205 via network 206. Image analysis system 205 is for generating an estimate of the skin color of subject 203. In embodiments of the present invention, image analysis system 205 compares the imaged reference color set 204 with a control reference color set (e.g., 208) to determine how the colors of imaged reference color set 204 have been transformed due to ambient lighting conditions and the image processing parameters of image capture device 201. Image analysis system 205 then determines a function which, when applied to color descriptions of the imaged reference color set 204, substantially eliminates the discrepancy between the control reference color set 208 and the imaged reference color set 204. In so doing, a modified color description 209 is created which accurately conveys the true colors at the location where image 202 was captured. In embodiments of the present invention, when the color correction function is applied to the color description of identified skin pixels, the modified color description of those skin pixels accurately conveys the natural skin color of subject 203 in a reference color space that is independent of the ambient lighting conditions and image processing parameters of image capture device 201.

Embodiments of the present invention are advantageous in that they do not require a controlled infrastructure because image analysis system 205 utilizes the received image of imaged reference color set 204 to compensate for the ambient lighting conditions and image processing parameters of image capture device 201. For example, image analysis system 205 may compare color descriptions of colors comprising imaged reference color set 204 with color descriptions of corresponding colors from control reference color set 208. As a result, embodiments of the present invention do not rely upon calibrated cameras or calibrated lighting when capturing an image of subject 203. By performing this analysis, image analysis system 205 can infer the combined effects of the ambient lighting conditions of the location at which subject 203 is located and the image processing characteristics of image capture device 201. Image analysis system 205 can then determine what adjustments are necessary so that the received image of imaged reference color set 204 corresponds with the known spectral reflectance and color signal values of the control reference color set 208. Image analysis system 205 can thus compensate for distortions of the image induced by ambient lighting and image processing parameters of the camera capturing the image and, based on this analysis, infer the natural skin coloration of subject 203. While the present invention recites that a controlled infrastructure is not required, embodiments of the present invention may be used in conjunction with a controlled infrastructure as well.

In embodiments of the present invention, image capture device 201 may comprise personal property of subject 203 such as a picture phone, a digital camera, a personal digital assistant (PDA), a personal computer system, a digital video recorder, or a similar device capable of capturing an image. However, embodiments of the present invention may also be used in proprietary systems in which a manufacturer provides a kiosk or other automated system for providing product consultation.

In other embodiments of the present invention, image capture device 201 may comprise multiple cameras. These cameras may provide multiple images to image analysis system 205, for determination of a skin color estimate. In some embodiments, image analysis system may apply standard algorithms for 3D shape reconstruction to the multiple images received from the multiple cameras, so that shape information may be used in the color correction determination, skin pixel selection, or other steps of the skin color estimation process. Shape reconstruction algorithms may also be applied within image capture device 201, so that the data received by image analysis system 205 comprises both color and shape (e.g. per-pixel depth or disparity measurements) information.

In embodiments of the present invention, network 206 comprises a dial-up Internet connection, a public switched telephone network (PSTN), a high-speed network connection (e.g., cable Internet, or high-speed computer network), or the like. Alternatively, image capture device 201 may utilize a cellular telephone connection, a satellite telephone connection, a radio connection, an infra-red communication connection, or the like. However, as will be discussed in greater detail below, embodiments of the present invention do not require that image 202 be conveyed to a separate system from image capture device 201.

Figure 3:
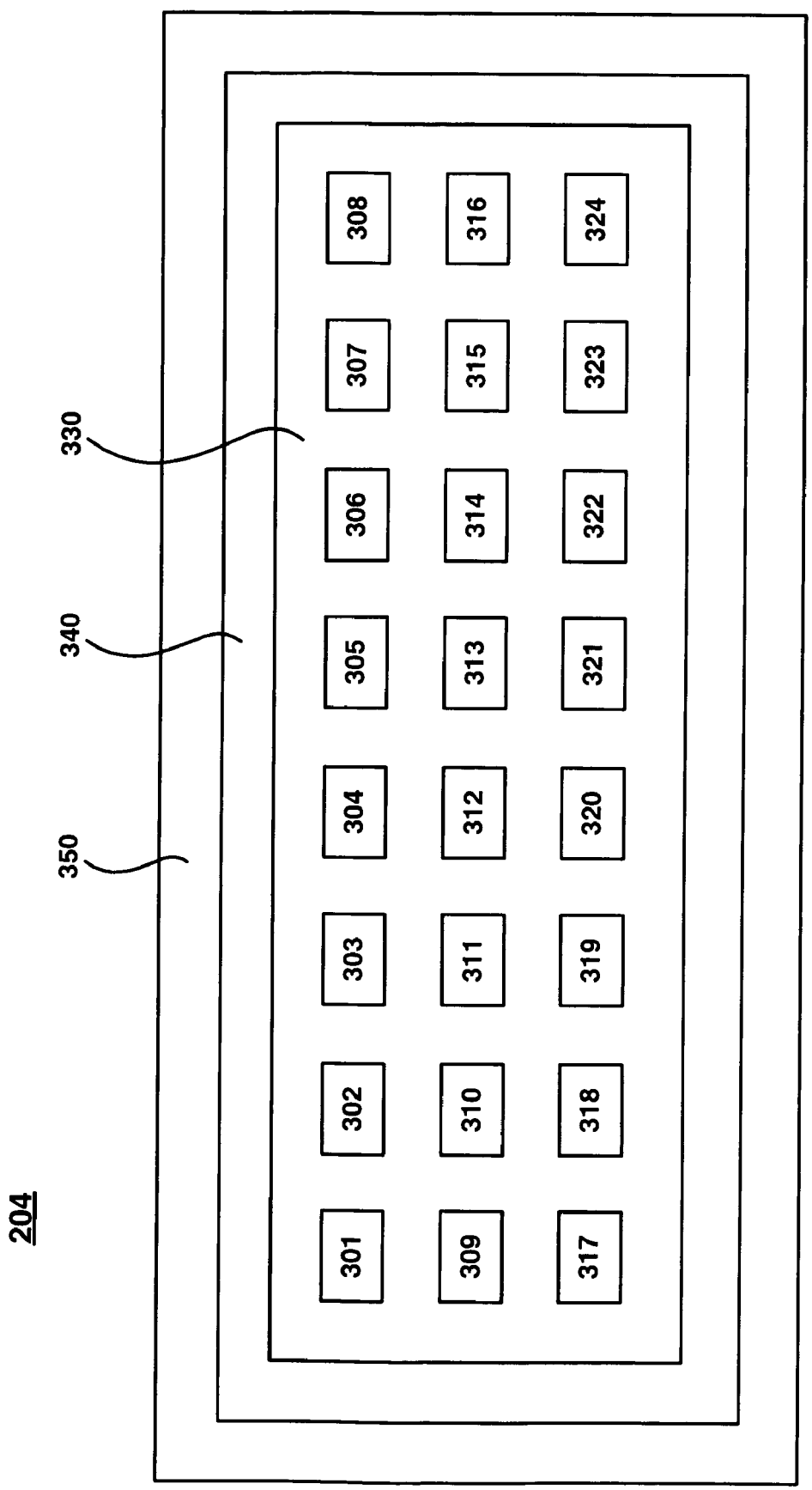
FIG. 3 shows an exemplary color reference set used in embodiments of the present invention.

FIG. 3 shows an exemplary imaged reference color set 204 used in embodiments of the present invention. It is noted that while the following discussion recites regions of imaged reference color set 204 comprising a color or colors, for the sake of clarity, these colors have been omitted from FIG. 3. In embodiments of the present invention, imaged reference color set 204 is designed for robust automatic detection by image analysis system 205.

As shown in the embodiment of FIG. 3, imaged reference color set 204 comprises a plurality of color patches (e.g., 301-324) which are arrayed in 3 rows of 8 color patches each. In embodiments of the present invention, color patches 301-324 are set against a black background 330 which is bounded by a white border 340 and a black border 350. In embodiments of the present invention, image analysis system 205 uses a detection algorithm to identify a pattern consistent to that produced by bounding black background 330 with white border 340. Black border 350 is used to facilitate identifying white border 340. It is noted that embodiments of the present invention are not limited to this type of pattern alone and that any detectable reference pattern arrangement may be used provided that image analysis system 205 can detect the pattern when it is present in image 202. For example, imaged reference color set 204 may comprise a checkerboard pattern, stripes, or background in which the colors represented by color patches 301-324 are embedded into wall paper, wall hangings, rugs, etc. Additionally, while FIG. 3 shows a rectangular array, color patches 301-324 may be disposed in a circular pattern, a triangular pattern, a square pattern, etc. as well.

In the embodiment of FIG. 3, color patches 301-308 comprise primary and secondary colors for general scene tone balancing and two shades of gray for white balancing. Color patches 309-324 comprise sixteen color patches representative of a range of human skin colors. In embodiments of the present invention, the color descriptions of control reference color set 208 are known to image analysis system 205 and are used to describe the reference, or "true," color space, independent of lighting and image capture device characteristics, to which imaged reference color set 204 is compared. For example, in one embodiment, the spectral reflectances of each color patch (e.g., 301-324) is measured and then approximated as a 3-component standard red, green, blue (sRGB) encoded digital value. These encoded signal values are then compared with the corresponding 3-component signal values of imaged reference color set 204.

Figure 4:
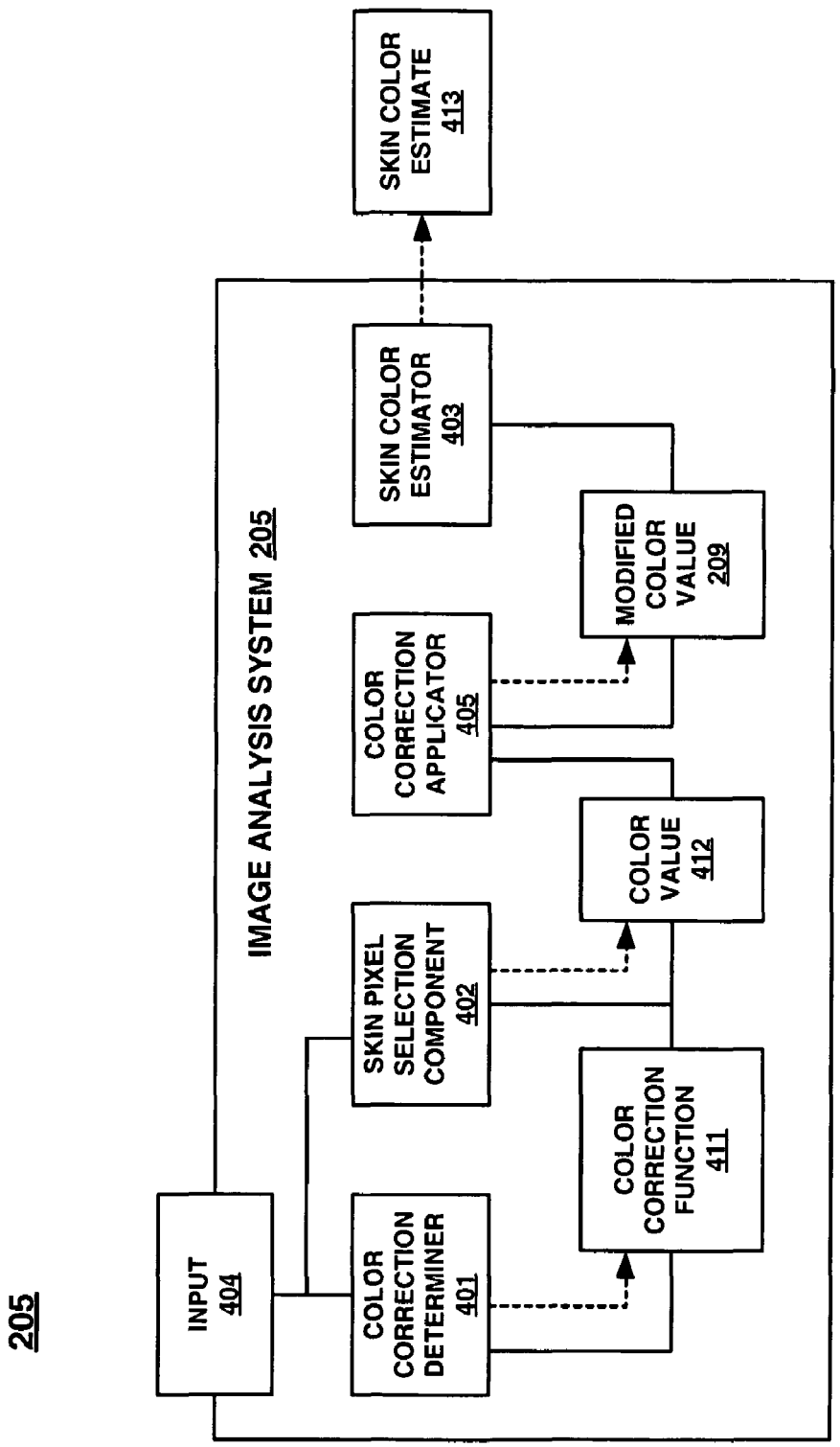
FIG. 4 is a block diagram of an image analysis system for providing a skin color estimate in accordance with embodiments of the present invention.

FIG. 4 is a block diagram of an image analysis system 205 for providing product consulting in accordance with embodiments of the present invention. In embodiments of the present invention, image analysis system 205 comprises an input 404, a color correction determiner 401, a skin pixel selection component 402, a color correction applicator 405, and a skin color estimator 403. In the embodiment of FIG. 4, an image 202 is received by input 404 and sent to color correction determiner 401 and skin pixel selection component 402. Then, a color correction function 411 is output from color correction determiner 401 while skin pixel selection component 402 identifies at least one skin pixel (e.g., color value 412) from image 202 to which color correction function 411 will be applied by color correction applicator 405. As a result of applying the color correction function 411 to the color value 412 of the identified skin pixel(s), a modified color value 209 is output to skin color estimator 403 which generates a skin color estimate 413 based thereon. As described above, the step of determining a color correction function may precede, follow, or be performed substantially simultaneously to the step of locating a plurality of skin pixels from image 202.

In embodiments of the present invention, color correction determiner 401 performs an automatic detection of a target pattern (e.g., imaged reference color set 204). In an exemplary target detection sequence, a monochrome (e.g., a luminance only) version of the color image is filtered using, for example, a Laplacian filter. This determines the locus of maximal brightness change in the image (e.g., between the color patches 301-324 and background 330, or between white border 340 and black border 350). The locus of zero-crossing positions observed in the Laplacian output are then connected, where possible, into a set of closed contours. Each of the closed contours is then approximated by a sequence of linear segments, which may be determined through a successive bisection operation based on deviation of the contour from a straight line. "Rectangle candidates" are accepted for those contours whose piecewise linear segmentation (as described above) results in four major pieces whose relationships are consistent with the projection of a planar rectangle (i.e., opposing sides are consistent with being parallel and adjacent sides are consistent with being orthogonal) In one embodiment, a first contour "rectangle candidate" is located whose contrast is indicative of a darker exterior (e.g., black border 350) and lighter interior (e.g., white border 340). Then, a second contour "rectangle candidate" is located inside the first, whose contrast is indicative of a lighter exterior (e.g., white border 340) and a darker interior (e.g., black background 330).

In embodiments of the present invention, it is then determined if the above contour (e.g., the edge of black background 330) contains a set of "rectangle candidate" contours (e.g., color patches 301-324) whose contrasts are indicative of lighter interiors set inside a darker exterior. For example, each of color patches 301-324 are lighter than the black background 330 in which they are positioned. A determination is made of the transformation that maps the outer two "rectangle candidate" contours (e.g., black border 350 and white border 340) to true rectangles of correct aspect and relationship based upon the known values of these contours from the reference target description. In the present embodiment, it is then determined whether the interior contours (e.g., of color patches 301-324) are also of the correct aspect ratio and at consistent locations when transformed by the above transformation (based upon the known values of the contours of the color patches). It is noted that some of the color patches may have contrast values that inhibit their detection in a given image 202. However, in embodiments of the present invention, if a sufficient number of interior color patches are detected (e.g., a suitable measure of "sufficiency" might be 90%), then the reference target is accepted as being detected. In embodiments of the present invention, the color values inside the above-detected and validated color patches are sampled and used as the sample values for establishing the true-color transformation performed by image analysis system 205.

In embodiments of the present invention, color correction determiner 401 validates the imaged reference color set 204 upon detection to ensure the fidelity of color patches 301-324 in image 202. For example, if color patches 301-324 fade, or become discolored due to staining, the results of sampling the color patches by image analysis system 205 may become skewed. As a result, an incorrect estimation of the color correction function 411 by color correction determiner 401 may result. Thus, in embodiments of the present invention, color correction determiner 401 may validate the age or version of imaged reference color set 204. For example, imaged reference color set 204 may comprise a pattern (e.g., a barcode), symbol, or character string (e.g., the date imaged reference color set 204 was printed) that is recognizable to image analysis system 205 and can be used to determine whether the imaged reference color set 204 is still valid. Alternatively, one or more of the inks used to create reference color set may be selected to fade after a given amount of time. As a result, portions of imaged reference color set 204 may become unrecognizable to color correction determiner 401, thereby preventing estimation of the color correction function and the true skin color from the received image 202. In another embodiment, fading of one or more of the inks may cause a message to be displayed which tells subject 202 that imaged reference color set 204 has expired and that a new version will be needed to generate an accurate skin color estimate 413.

In embodiments of the present invention, upon determining that the imaged reference color set 204 is a valid copy, color correction determiner 401 then estimates the color correction function 411, also referred to as a "transform function", between the color space of image 202 and the control reference color set 208. In one embodiment of the present invention, a least-squares estimation is used to derive a color correction function F in the form of 3×4 matrix, that maps measured patch mean colors M (e.g., from one or more of color patches 301-324) from imaged reference color set 204 to corresponding control color values R in control reference color set 208. The matrix F is effectively a 3×3 color transformation matrix plus an additive per-color-component offset. In embodiments of the present invention, prior to performing the least-squares estimation, patch mean colors with at least one saturated component are excluded, and the sRGB color component function is inverted for both M and R. However, while a 3×4 matrix may be used to determine the color correction function, embodiments of the present invention are not limited to linear algebra to determine this function. In other words, the color correction function can take any functional form.

In embodiments of the present invention, all of the color patches from imaged reference color set 204 may be measured and used to determine the color correction function 411. In another embodiment, the color patches may be selectively sampled. For example, in one embodiment, only the color patches (e.g., 301-308) of the primary, secondary, and monochrome colors (e.g., blue, green, red, cyan, magenta, yellow, and gray shades) are used to determine color correction function 411. Embodiments of the present invention may also sample white tones from white border 340 and black tones from background 330 or black border 350. In another embodiment, all of the skin colored patches (e.g., color patches 309-324) as well as black, white, and gray tones are sampled in order to determine color correction function 411. In another embodiment, only the skin colored patches (e.g., color patches 309-324) are sampled to determine color correction function 411. In embodiments of the present invention, it may be advantageous to only sample the skin colored patches (e.g., color patches 309-324) in order to determine a color correction 411 function best suited for estimating the skin color of subject 203. For example, sampling all of the imaged color patches from the imaged reference color set may result in a color correction function 411 that is best suited for correcting the colors of the overall image, but is not necessarily best suited for correcting the imaged skin color of subject 203. Thus, dense sampling of the color region of interest (e.g., skin tones) may be more important than a broad sampling of the overall color space when estimating a color correction function suitable for use in estimating the skin color of subject 203.

Thus, color correction determiner 401 determines a color correction function 411 which substantially eliminates discrepancies between the imaged reference color set 204 and the control reference color set 208. If we denote color correction function 411, in any functional form, as F, then this can be expressed by the equation:

$$I\_R = F(I\_C)$$

where I_R is a color in control reference color set 208 and I_C is a corresponding color from imaged reference color set 204. When applied to image 202, color correction function 411 attempts to accurately convey the colors of image 202 by compensating for the effects of ambient lighting conditions and the imaging characteristics of image capture device 201. More specifically, after color correction function 411 is applied to the skin pixels identified in image 202, the skin color of subject 203 can be determined without the distorting effects of ambient lighting conditions and the imaging characteristics of image capture device 201. It is noted that color correction 411 may only be approximate. For example, the color correction function F may not map each acquired image color from imaged reference color set 204 to its exact corresponding reference color in control reference color set 208. Furthermore, it is appreciated that F may lack the degree of precision necessary to cause an exact match to a reference color in control reference color set 208 when applied to the corresponding color in imaged reference color set 204. For the purposes of the present invention, the phrase "substantially eliminates" means that, after F has been applied to the color value 412 of the identified skin pixels of image 202 (e.g., or color descriptions thereof), the difference between the natural skin color of subject 203 (i.e. in the reference color space described by control reference color set 208) and the corrected skin color of subject 203, represented by modified color description 209, are not readily discernable.

In some embodiments of the present invention, color correction determiner 401 may use 3D shape information to determine color correction function 411. As described above, shape information may be supplied by image capture device 201, or it may be computed by color correction determiner 401 from multiple images supplied by image capture device 201. The shape information may be used, for example, to determine whether the portions of the imaged reference color set 204 are illuminated differently, so that computation of color correction function 411 may be based on only a subset of the image reference colors, or so that multiple color correction functions 411 may be estimated. The shape information might also be used to help estimate and remove shadowing of colors within imaged reference color set 204. Other uses of 3D shape information may be made by color correction determiner 401. Multiple images supplied by image capture device 201 may also aid color correction determination in ways other than ones based on 3D shape computation. For instance, the multiple images may allow sampling of imaged reference colors 204 that are not possible to view from a single camera, thereby increasing the amount of data to be fed to the color correction determination process. Also, the multiple views may enable averaging of lighting and image device characteristics across multiple viewing angles.

Figure 5:
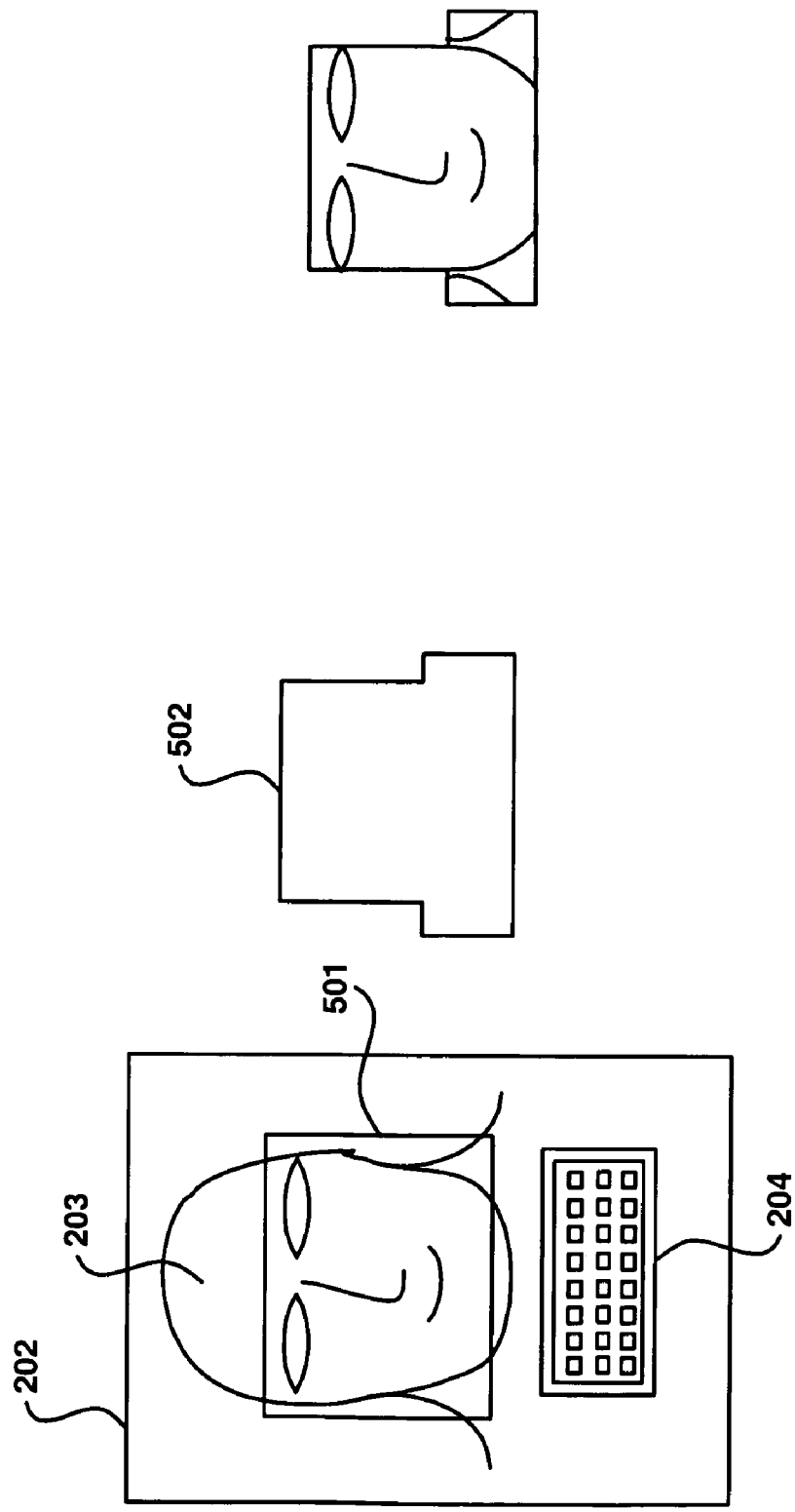
FIG. 5 shows exemplary steps in selecting skin pixels in accordance with embodiments of the present invention.

FIG. 5 shows exemplary steps in selecting skin pixels in accordance with embodiments of the present invention. Skin pixel selection component 402 is for identifying pixels in image 202 that are likely to correspond to skin regions of subject 203 and particularly to those regions which are likely to be representative of the natural skin color of subject 203. As discussed above, some people's skin may be blemished, shiny, sun tanned/burnt, freckled, or in some manner discolored from that person's natural skin color. Furthermore, when image 202 is captured, the ambient lighting may cause shadows or highlighted areas which are not representative of that person's natural skin color. Additionally, regions of image 202 which show the hair or eyes of subject 203 should be eliminated from analysis by categorizer 205 when estimating the skin color of subject 203. In embodiments of the present invention, skin pixel selection component 402 divides the step of identifying likely skin pixel areas of image 202 into two parts: finding the face of subject 203, and sampling the face to find a region that is relatively unaffected by blemishes, shadow, or other coloration irregularities.

In embodiments of the present invention, skin pixel selection component 402 utilizes face pattern detection algorithms to identify likely regions of image 202 which comprise the face of subject 203. In many applications of the invention, it is likely that subject 203 will be the only, or the most prominent, face shown in image 202. Thus, embodiments of the present invention may perform face detection via a C++ implementation of the Viola-Jones face detector, applied at multiple (e.g. 24) resolutions, with lenient detection thresholds and, if necessary, image rotation. In embodiments of the present invention, if multiple regions are identified that are likely to be the face of subject 203 (e.g., multiple faces in image 202), skin pixel selection component 402 will select for further processing the largest region that has been identified as a likely face region. It is noted that embodiments of the present invention may also utilize skin color detection algorithms to further refine the identification of likely skin regions of subject 203. In embodiments of the present invention, the region of image 202 identified by the face detection algorithm is bounded by a face bounding box (e.g., 501 of FIG. 5) imposed on the image 202.

In embodiments of the present invention, skin pixel selection component 402 applies a binary "face mask" template (e.g., 502 of FIG. 5) within face bounding box 501. This is applied because the location of facial features within face bounding box 501 is typically not constant across all images 202. Thus, face bounding box 501 typically includes non-face background and non-face features of subject 203. As discussed above, ambient lighting and hair can also cause shadows to fall on any part of the face of subject 203, and skin texture is well known to produce large regions of specularities. Thus, in embodiments of the present invention, template 502 isolates skin regions that have a high probability of being representative of the natural skin color of subject 203, without requiring detailed parsing of the facial features and without segmentation of the face from the background.

As shown in FIG. 5, template 502 excludes outer regions shown in face bounding box 501 such as the hair, and forehead of subject 203, as well as most of the background of image 202. However, template 502 is extended somewhat in the lower region to emphasize the sampling of skin pixels in the cheek regions of subject 203. In another embodiment, explicit detection of facial features such as the eyes, nose, and mouth of subject 203 is performed, followed by pixel selection of regions defined relative to these detected features. It is noted that the above description is only one way in which the face pixels of image 202 are detected and that there are a variety of other well known facial feature detection methods known in the art that may be utilized in accordance with embodiments of the present invention.

In embodiments of the present invention, the pixels remaining within template 502 are then sorted by luminance. It is noted that there are a variety of methods for computing luminance in accordance with embodiments of the present invention. In one embodiment, the luminance (y) of a pixel may be computed using the following formula:

$$Y=R+G+B$$

where R, G, and B are the red, green, and blue component values of the pixel. Having computed the luminance of each pixel, skin pixel selection component 402 sorts the pixels in order of increasing luminance. Skin pixel selection component 402 then eliminates skin pixels that have a luminance below a lower threshold or above an upper threshold. This excludes high-end specularities (e.g., shiny skin) whose luminance typically falls above the upper luminance threshold. This also excludes pixels corresponding with the hair, nostrils, mouths, and shadowed portions of the subject's face which are typically associated with low luminance values that fall below the lower luminance threshold.

In one embodiment, the remaining pixels are clustered according to color in the control reference color set 208. Then, pixel clusters in probable skin color ranges are identified using a model of skin color that applies over a wide range of image capture and lighting conditions. In one embodiment, the largest cluster of skin color pixels is selected as being representative of the skin color of subject 203. In another embodiment, the cluster having the greatest pixel density (i.e. number of pixels per unit volume in color space) is selected.

Again, it is noted that the identification of skin pixels within image 202 can be performed independently from the color correction estimation described above with reference to step 130 of FIG. 1. Thus, in embodiments of the present invention, identification of skin pixels within image 202 may be performed prior to, subsequent to, or substantially simultaneously with the color correction estimation described above with reference to step 130 of FIG. 1 and the discussion of FIG. 4.

In some embodiments of the present invention, 3D shape information is used to aid skin pixel selection component 402. The 3D shape information may be supplied by image capture device 201, or it may be computed, from multiple images supplied by capture device 201, by skin pixel selection component 402 or color correction determination component 401. The shape information may be used in identification of facial features such as nose or mouth, so that such regions may be preferentially excluded or included in skin pixel selection. The 3D shape information may also be used in estimation of shadowing on the face. Knowledge of shadowing can be used to exclude certain pixels from skin pixel selection, or it can be used to modify the skin pixel color descriptions. Multiple images supplied by image capture device 201 may also aid skin pixel selection in ways other than ones based on 3D shape computation. For instance, the multiple images may allow sampling of multiple skin regions that are not possible to view from a single camera, thereby increasing the amount of data to be fed to skin color estimation process. In addition, selection of skin regions from multiple images may allow for averaging of lighting and imaging device effects over multiple viewing angles.

In embodiments of the present invention, upon identifying skin pixels within image 202 that are most likely to represent the natural skin color of subject 203, at least one description of the color values of those pixels is constructed (e.g., color value 412 of FIG. 4). In embodiments of the present invention, color descriptions of the identified skin pixels may comprise individual color values such as a three-component vector in an RGB space. In other embodiments of the present invention, aggregate color descriptions of the identified skin pixels may be used. Examples of aggregate color descriptions used in embodiments of the present invention may include, but are not limited to, the mean and co-variance of a multi-dimensional Gaussian function that fits a collection of individual color samples. Another example may be the bounds of a range in some color space. In another embodiment, the aggregate color description may be considered a color "class" or a color "bin".

In the embodiment of FIG. 4, color correction applicator 405 receives color correction function 411 from color correction determiner 401 and the color values (e.g., 412) of the skin pixels selected by skin pixel selection component 402 as being representative of the skin color of subject 203. In one embodiment, color correction applicator 405 then applies color correction function 411 to the color values 412 and outputs modified color values 209 as a result. In another embodiment, the function of color correction applicator 405 may be performed immediately following the actions of color correction determiner 401, skin pixel selection component 402, or skin color estimator 403.

In embodiments of the present invention, modified color value 209 is accessed by skin color estimator 403, which then generates a skin color estimate 413 of subject 203 based upon an analysis of modified color value 209. As described above, in modified color value 209 the effects of ambient lighting and imaging characteristics of image capture device 201 which may have been existing at the time image 202 was captured have been substantially eliminated. In embodiments of the present invention, the skin color estimate 413 may comprise a single vector having the same dimension as reference colors in the control reference color set 208. In another embodiment, skin color estimate 413 may comprise a probability density function over the color space represented by control reference color set 208. In another embodiment, a variance or a probability of error is computed for each skin color estimate 413 generated by image analysis system 205. In another embodiment, an averaging of the skin pixel values, with optional weights, may result in a single skin color estimate 413. The optional weights may be determined in part by the likelihoods of individual skin pixels being located at good image sampling locations for skin, where these likelihoods are determined by skin pixel selection component 402. It is noted that skin color estimate 413 may not comprise a single skin color, but may refer to a class or range of skin colors.

Figure 6:
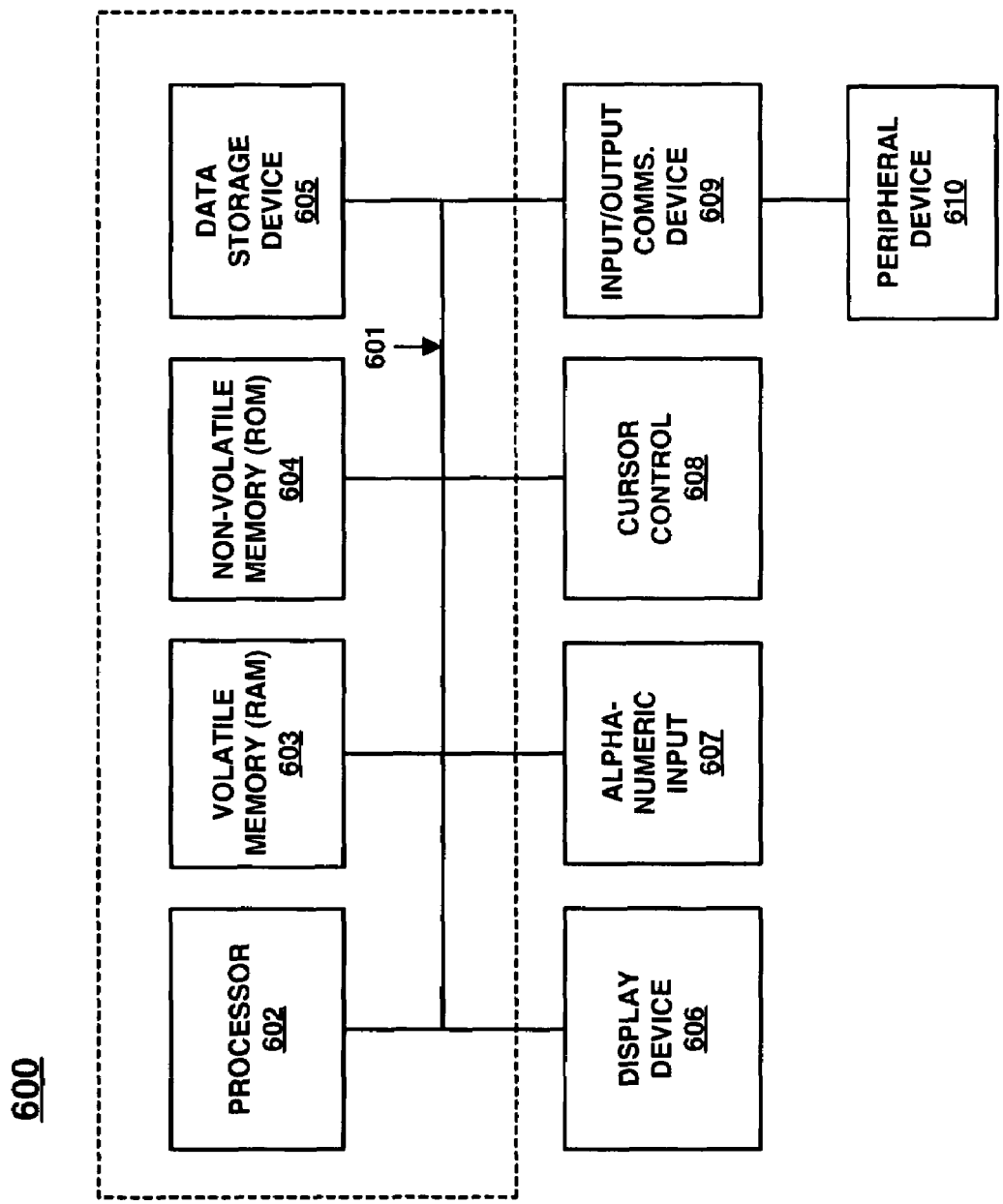
FIG. 6 is a block diagram of an exemplary computer system upon which embodiments of the present invention may be implemented.

FIG. 6 is a block diagram of an exemplary computer system 600 upon which embodiments of the present invention may be implemented. In embodiments of the present invention, portions of the present invention are comprised of computer-readable and computer-executable instructions that reside, for example, in computer system 600 which is used as a part of a general purpose computer network (not shown). It is appreciated that computer system 600 of FIG. 6 is exemplary only and that the present invention can operate within a number of different computer systems including general-purpose computer systems, embedded computer systems, laptop computer systems, hand-held computer systems, networked computer systems, and stand-alone computer systems.

In the present embodiment, computer system 600 includes an address/data bus 601 for conveying digital information between the various components, a central processor unit (CPU) 602 for processing the digital information and instructions, a volatile main memory 603 comprised of volatile random access memory (RAM) for storing the digital information and instructions, and a non-volatile read only memory (ROM) 604 for storing information and instructions of a more permanent nature. In addition, computer system 600 may also include a data storage device 605 (e.g., a magnetic, optical, floppy, or tape drive or the like) for storing vast amounts of data. It should be noted that the software program for performing skin color estimation of the present invention can be stored either in volatile memory 603, data storage device 605, or in an external storage device (not shown).

Devices which are optionally coupled to computer system 600 include a display device 606 for displaying information to a computer user, an alpha-numeric input device 607 (e.g., a keyboard), and a cursor control device 608 (e.g., mouse, trackball, light pen, etc.) for inputting data, selections, updates, etc. Computer system 600 can also include a mechanism for emitting an audible signal (not shown).

Returning still to FIG. 6, optional display device 606 of FIG. 6 may be a liquid crystal device, cathode ray tube, or other display device suitable for creating graphic images and alpha-numeric characters recognizable to a user. Optional cursor control device 608 allows the computer user to dynamically signal the two dimensional movement of a visible symbol (cursor) on a display screen of display device 606. Many implementations of cursor control device 608 are known in the art including a trackball, mouse, touch pad, joystick, or special keys on alpha-numeric input 607 capable of signaling movement of a given direction or manner displacement. Alternatively, it will be appreciated that a cursor can be directed and activated via input from alpha-numeric input 607 using special keys and key sequence commands.

Alternatively, the cursor may be directed and activated via input from a number of specially adapted cursor directing devices.

Furthermore, computer system 600 can include an input/output (I/O) signal unit (e.g., interface) 609 for interfacing with a peripheral device 610 (e.g., a computer network, modem, mass storage device, etc.). Accordingly, computer system 600 may be coupled in a network, such as a client/server environment, whereby a number of clients (e.g., personal computers, workstations, portable computers, minicomputers, terminals, etc.) are used to run processes for performing desired tasks. In particular, computer system 600 can be coupled in a system for estimating skin color from an image.

The preferred embodiment of the present invention, a method and system for skin color estimation from a image, is thus described. While the present invention has been described in particular embodiments, it should be appreciated that the present invention should not be construed as limited by such embodiments, but rather construed according to the following claims.

What is claimed is:

1. A computer implemented method for estimating skin color from at least one image, said method comprising:
    accessing at least one image of a subject and of an imaged reference color set by using an input;
    locating at least one skin pixel of said subject in said at least one image and determining a color description thereof by using a skin pixel selection component;
    determining a color correction function to be applied to said color description of said at least one skin pixel by using a color correction determiner;
    applying said color correction function to said color description of said at least one skin pixel to create a modified color description by using a skin color estimator; and
    generating a skin color estimate of said subject based upon an analysis of said modified color description by using a skin color estimator.

2. The computer implemented method as recited in claim 1 wherein capturing said at least one image does not require a controlled infrastructure.

3. The computer implemented method as recited in claim 1 further comprising:
    identifying said imaged reference color set within said at least one image; and
    sampling at least one reference color from a known location relative to said imaged reference color set.

4. The computer implemented method as recited in claim 3 further comprising:
    printing said imaged reference color set using a fading ink wherein the fading of said ink renders said imaged reference color set unusable when it is no longer valid.

5. The computer implemented method as recited in claim 3 wherein said determining further comprises:
    calculating a first description corresponding to the observed characteristics of said at least one reference color; and
    comparing said first description with a second description corresponding with the control characteristics of said at least one color;
    discovering a discrepancy between said first description and said second description; and
    determining said color correction function which is applied to said first description to substantially eliminate said discrepancy.

6. The computer implemented method as recited in claim 3 wherein said at least one reference color is representative of a human skin color.

7. The computer implemented method as recited in claim 1 further comprising:
    processing said at least one image using an automatic face detection algorithm;
    identifying said at least one skin pixel which is representative of the skin color of said subject;
    applying said color correction function to said color description of said at least one skin pixel to create a modified skin color description; and
    analyzing said modified skin color description to determine said skin color estimate.

8. The computer implemented method as recited in claim 1 wherein locating said at least one skin pixel further comprises:
    clustering said at least one skin pixel in a reference color space.

9. The computer implemented method as recited in claim 1 wherein said locating further comprises:
    generating a probability that said at least one skin pixel comprises human skin; and
    using said probability when determining said skin color estimate.

10. The computer implemented method as recited in claim 1 wherein said generating further comprises:
    outputting an estimate of the skin color of said subject in the form of a single vector value.

11. An image analysis system comprising:
    an input for accessing at least one image of a subject and of an imaged reference color set;
    a skin pixel selection component for locating a plurality of skin pixels of said subject in said at least one image and determining a color description thereof;
    a color correction determiner for determining a color correction function to be applied to said color description of said plurality of skin pixels;
    a color correction applicator for applying said color correction function to said color description of said plurality of skin pixels to create a modified color description; and
    a skin color estimator for generating a skin color estimate of said subject based upon an analysis of said modified color description.

12. The image analysis system of claim 11 wherein the capturing of said at least one image does not require a controlled infrastructure.

13. The image analysis system of claim 11 wherein said color correction determiner further identifies said imaged reference color set within said at least one image and samples at least one reference color from a known location relative to said imaged reference color set.

14. The image analysis system of claim 13 wherein said color correction determiner is further for comparing a first description corresponding to the observed characteristics of said at least one color with a second description corresponding with the control characteristics of said at least one color to discover a discrepancy between said first description and said second description and is further for determining said color correction function which, when applied to said first description, substantially eliminates said discrepancy.

15. The image analysis system of claim 13 wherein said at least one reference color is representative of a human skin color.

16. The image analysis system of claim 13 wherein said color correction applicator is for applying said color correction function to said color description of said at least one skin pixel to create a corresponding modified skin color description and wherein said skin color estimator analyzes said modified skin color description to determine said skin color estimate.

17. The image analysis system of claim 11 wherein said skin pixel selection component uses a skin color detection algorithm to detect a color representative of human skin in said at least one image.

18. The image analysis system of claim 11 wherein said skin pixel selection component is for clustering said plurality of skin pixels in a reference color space.

19. The image analysis system of claim 11 wherein said skin pixel selection component is further for generating a probability that said at least one skin pixel comprises human skin and for using said probability when determining said skin color estimate.

20. The image analysis system of claim 11 wherein said skin color estimator outputs an estimate of the skin color of said subject in the form a single vector value.

21. A computer-usable medium having computer-readable program code embodied therein for causing a computer system to perform a method for estimating skin color from at least one image, said method comprising:
    accessing at least one image of a subject and of an imaged reference color set by using an input
    locating at least one skin pixel of said subject in said at least one image and determining a color description thereof by using a skin pixel selection component;
    determining a color correction function to be applied to said color description of said at least one skin pixel by using a color correction determiner;
    applying said color correction function to said color description of said at least one skin pixel to create a modified color description by using a color correction applicator; and
    generating a skin color estimate of said subject based upon an analysis of said modified color description by using a skin color estimator.

22. The computer-usable medium of claim 21 wherein the capturing said at least one image does not require a controlled infrastructure.

23. The computer-usable medium of claim 21 further comprising:
    identifying said imaged reference color set within said at least one image; and
    sampling at least one reference color from a known location relative to said imaged reference color set.

24. The computer-usable medium of claim 23 wherein said determining further comprises:
    calculating a first description corresponding to the observed characteristics of said at least one color; and
    comparing said first description with a second description corresponding with the control characteristics of said at least one color;
    discovering a discrepancy between said first description and said second description; and
    determining said color correction function which is applied to said first description to substantially eliminate said discrepancy.

25. The computer-usable medium of claim 23 wherein said at least one reference color is representative of a human skin color.

26. The computer-usable medium of claim 23 wherein said method further comprises:
    applying said color correction function to said color description of said at least one skin pixel to create a modified skin color description; and
    analyzing said modified skin color description to determine said skin color estimate.

27. The computer-usable medium of claim 21 wherein said locating further comprises:
    using a skin color detection algorithm to detect a color representative of human skin in said at least one image.

28. The computer-usable medium of claim 21 wherein locating said at least one skin pixel further comprises:
    clustering said at least one skin pixel in a reference color space.

29. The computer-usable medium of claim 21 wherein said locating further comprises:
    generating a probability that said at least one skin pixel comprises human skin; and
    using said probability when determining said skin color estimate.

30. The computer-usable medium of claim 21 wherein said generating further comprises:
    generating an estimate of the skin color of said subject in the form of a single vector value.

\* \* \* \* \*

UNITED STATES PATENT AND TRADEMARK OFFICE
CERTIFICATE OF CORRECTION

| | | |
|---|---|---|
| PATENT NO. | : 7,522,769 B2 | Page 1 of 1 |
| APPLICATION NO. | : 11/233602 | |
| DATED | : April 21, 2009 | |
| INVENTOR(S) | : Michael Harville et al. | |

It is certified that error appears in the above-identified patent and that said Letters Patent is hereby corrected as shown below:

In column 15, lines 35-36, in Claim 1, delete "by using a skin color estimator" and insert -- by using a color correction applicator --, therefor.

In column 17, line 20, in Claim 20, after "form" insert -- of --.

Signed and Sealed this

Twenty-fourth Day of November, 2009

David J. Kappos
*Director of the United States Patent and Trademark Office*